Patented June 20, 1950

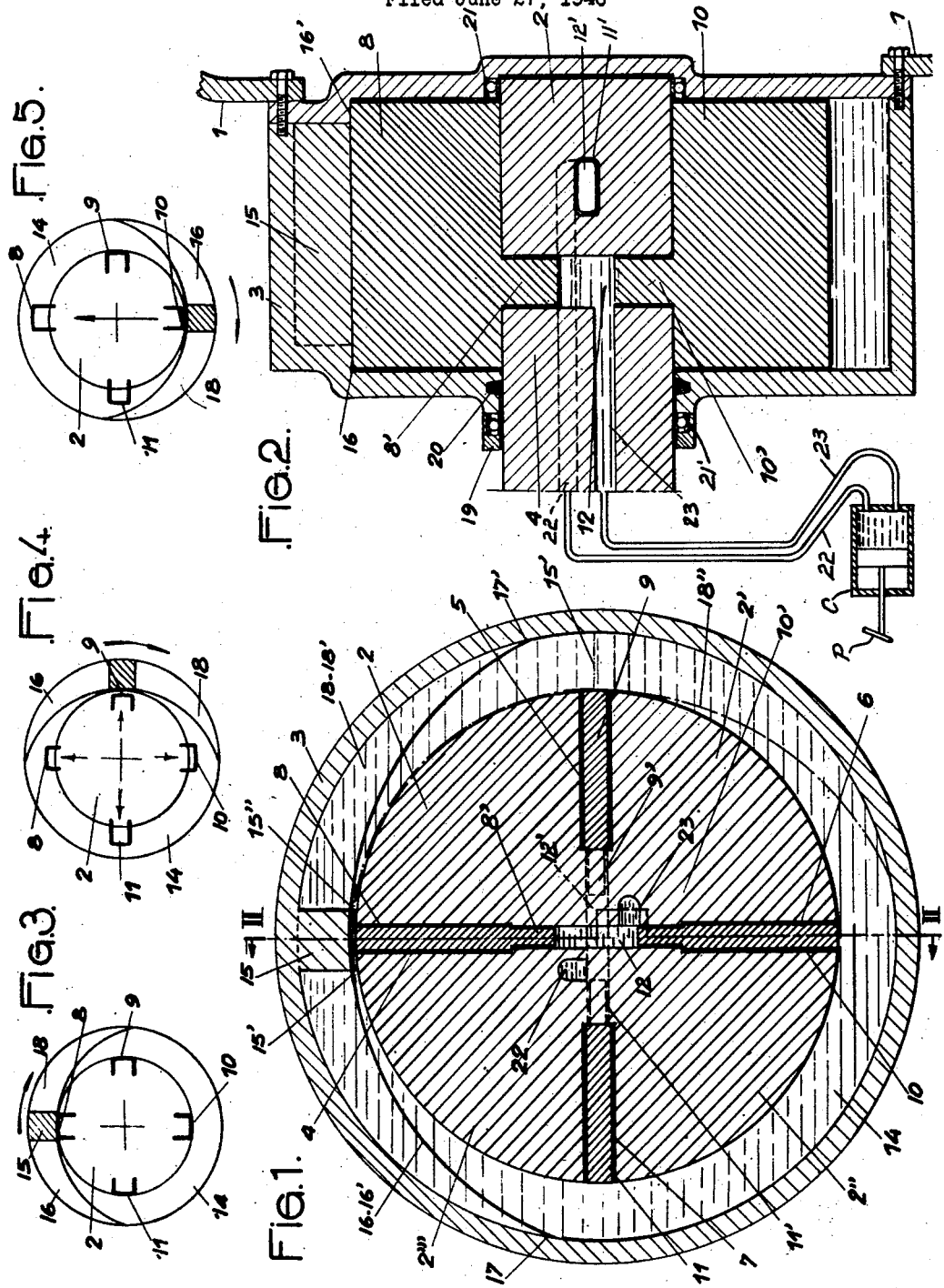

2,512,248

UNITED STATES PATENT OFFICE 2,512,248

HYDRAULIC RESISTANCE BRAKE FOR ROTARY MEMBERS

René Jean Louis Gassot, Paris, France

Application June 27, 1946, Serial No. 679,693
In France July 9, 1945

3 Claims. (Cl. 188—90)

The present invention has for its object to provide a brake for a rotary member such as a vehicle wheel, the rotary part of a machine and other applications.

A first object of the invention is to provide a brake which comprises an element fast with the rotary member and an element fast with a stationary structure, at least a chamber containing a fluid, means controlled from the element fast with the rotary member for setting said fluid in motion and closing members which can be projected into said chamber for throttling it and laminating the fluid which has been set in motion which thus insures the braking through the reaction upon the element fast with the rotary member.

Another object of the invention is to use in said chamber an incompressible fluid such as a hydraulic control fluid or a compressible fluid such as air.

Still another object of the invention is to provide a brake of this type which comprises a cylindrical drum of a wheel rotatably mounted on a journal, an integral core fixedly mounted on said journal inwardly of said drum, an annular chamber provided between said core and drum, a fluid in said chamber, a flange on the inner wall of the drum intersecting said chamber, guides in the fixed core, vanes sliding in said guides, means for projecting said vanes out of the core and into said chamber and lateral cams inside the drum on both sides of the flange in order to return the vanes inside their guides before the passage of the flange.

Other objects and advantages will appear from the following description.

The preferred form of execution of a brake made according to the invention is shown by way of example in the appended drawings.

Fig. 1 is a sectional elevational view showing a brake made according to the invention.

Fig. 2 is a sectional view through line II—II of Fig. 1.

Figs. 3, 4 and 5 are diagrammatical views explaining the operation of the brake.

Referring to Figs. 1 and 2, the wheel 1 of a vehicle carries a drum 3 rotating with said wheel around a fluidtight cylindrical core 2 secured on the journal. The core 2 is formed of four sectors 2—2', 2''—2''' forming guideways 4, 5, 6, 7 in which are arranged vanes 8, 9, 10, 11 which are guided with an easy sliding fit and in a substantially fluid-tight manner. Said vanes terminate at their inner ends in an extension having a smaller width 8', 9', 10', 11'. Said extensions form pistons entering corresponding recesses in the core 2, the vane feet 8' and 10' entering recesses which communicate with a chamber 12 and the vane feet 9' and 11' entering recesses which communicate with chamber 12', said chambers 12 and 12' being respectively connected with passages 23 and 22 which receive fluid under pressure from a master control cylinder C which may be operated in the usual manner by a pedal P or the like.

The drum 3 is spaced from the periphery of the core 2 so as to leave between both said elements a passage 14 having a circular substantially constant section. A projection 15 is provided on the inner periphery of the drum 3 on the whole width and depth of the passage 14, so as to form a flange intersecting said passage. Provided on each of both sides of said flange 15 are two laterally extended cam-forming slopes 16—16', 18—18' both first ones of which start from the inner concentric periphery 17 of the drum 3 and terminating on the edge 15' of the flange 15 while the second ones extend from the inner periphery 17' of the drum 3 to the edge 15'' of the flange 15.

The drum 3 rotates on the journal 4 of the wheel through a sleeve 19 by means of ball bearings 21, 21' with the interposition of a tight joint 20.

The brake according to Figs. 1 and 2 works as follows.

The annular passage or chamber 14 is almost filled with an incompressible liquid. In normal operation the drum 3 rotates with the wheel and the vanes 8, 9, 10, 11 remain inside their respective guideways 4, 5, 6, 7 in the core 2 where they are maintained through the pressure of the liquid contained in the annular chamber 14 which is greater than the normal pressure of the fluid in the chambers 12 and 12'. When the brake is to be operated a pressure is generated in the chambers 12 and 12' through any hydraulic or pneumatic means as for example by a direct discharge through the passages 22 and 23 of a pressure generated in the master cylinder C in the usual manner, as shown in Fig. 2. Under said pressure the vanes 8, 9, 10, 11 are driven outwardly to a larger or smaller extent according to the braking pressure so that they come to throttle the chamber 14 while laminating the liquid forced by the flange 15. Thus, said liquid exerts a braking reaction on the flange 15 as well as on the drum 3 and the wheel 1 which is fast therewith. The braking action is a function of the extent to which the vanes are thrown outwardly of the core 2 in the chamber 14 which they intersect more or less. Since the drum 3 rotates further during a partial braking the vanes have re-entered their guideways when the cams 16—16' which rotate clockwise or the cams 18—18' which rotate counterclockwise engage them, which make it possible for the flange 15 to pass without striking against the vanes the latter being projected outwardly again when the flange 15 has passed. In fact, the vane forced back by the cams discharges the hydraulic fluid contained in the chambers 12 which projects the opposed vane outwardly.

The flange 15 can be a wall having a small thickness, as shown. It can also be a larger or smaller sector extending up to 90° as shown in chain dotted lines at 15'. In this case the cams 18 and 18' are transferred beyond the extremity 15' of said flange as shown in chain dotted lines at 18''.

Figs. 3, 4 and 5 diagrammatically illustrate the operation of the brake. In Fig. 3, the vanes 8, 9, 10, 11 are drawn back so that there is no braking, the wheel freely rotating with the drum 3. In Fig. 4, the vanes are projected to a certain extent into the passage 14. They thus laminate the liquid contained in said passage which produces the braking through the reaction upon the flange 15. In Fig. 5 it may be seen that the cam 18 has just pushed back a vane 10 the action of said vane upon the liquid contained in the chamber 12 having for its effect to cause the opposed vane 8 to project outwardly.

Of course the invention is not limited to the embodiment described as an illustrating example, because changes may be made within its frame. Particularly in case of driving wheels, the driving spindle is arranged in the center of the brake and is rigidly connected with the side plate secured to the rotary drum. The passages for the fluid under pressure controlling the vane feet are then arranged about said driving spindle, a gasket being provided to ensure fluidtightness.

Braking plants according to the invention advantageously comprise a piping which is obstructed at the moment of the braking and maintains a constant level of the liquid in the drums.

I claim:

1. A hydraulic brake which comprises, in combination, a sealed drum for attachment to a rotatable member such as a wheel, a non-rotatable axle member about which said drum is rotatably mounted, a core fixed on said axle and fitting within said drum substantially from wall to wall thereof, said core having a smaller diameter than said drum to form an annular chamber therebetween, radial slots in said core and extending across the axial width thereof, vanes slidable in said slots and extending the length thereof to substantially span the distance between the walls of said drum, a partition extending across the width of said drum and dividing the annular chamber, cam guides extending inwardly from the sides of said drum, the cam surfaces of said guides coinciding with the free edge of said partition, said guides extending on either side of said partition for at least a quarter of the circumference of said drum, an incompressible fluid filling at least a part of the annular chamber, fluid passageways in said axle member, each connected with one of said core slots, said vanes having base portions extending into said passageways and forming plungers therein, and a fluid connection between said passageways and a hydraulic master cylinder, whereby said vanes may be operated by fluid pressure from said master cylinder.

2. A brake as defined in claim 1 wherein the core is composed of four segments, having their adjacent radial walls spaced from each other to form four vane receiving slots.

3. A brake as defined in claim 1 wherein the said partition extends completely across said chamber to the periphery of said core and said cam guides are of very narrow width and on either ends of said partition.

RENÉ JEAN LOUIS GASSOT.

REFERENCES CITED

The following references are of record in the file of this patent:

UNITED STATES PATENTS

| Number | Name | Date |
| --- | --- | --- |
| 516,542 | Martin et al. | Mar. 13, 1894 |
| 1,559,462 | Ryan | Oct. 27, 1925 |
| 1,584,223 | Horspool et al. | Mar. 11, 1926 |
| 1,599,439 | Staude | Sept. 14, 1926 |
| 1,614,119 | Giovannini | Jan. 11, 1927 |
| 1,631,800 | Dotsch | June 7, 1927 |
| 1,635,006 | Oliver | July 5, 1927 |
| 1,886,301 | Peterson | Nov. 1, 1932 |
| 1,912,953 | Staats | June 6, 1933 |
| 1,939,605 | Dempsey | Dec. 12, 1933 |
| 2,030,308 | Marsh | Feb. 11, 1936 |
| 2,038,613 | Staats | Apr. 28, 1936 |
| 2,115,273 | Marsh | Apr. 26, 1938 |
| 2,124,173 | Wood | July 19, 1938 |
| 2,125,640 | Marsh | Aug. 2, 1938 |
| 2,358,825 | Pribula | Sept. 26, 1944 |